US005213854A

United States Patent [19]

Williams et al.

[11] Patent Number: 5,213,854

[45] Date of Patent: May 25, 1993

[54] ARTICLES WITH STONE-LIKE SURFACES, AND METHOD OF MANUFACTURE THEREFOR

[76] Inventors: Michael J. Williams; Anna P. Williams, both of 36 Waratah St., Christchurch, New Zealand

[21] Appl. No.: 498,419

[22] Filed: Mar. 26, 1990

[30] Foreign Application Priority Data

Mar. 30, 1989 [NZ] New Zealand ........................ 228528

[51] Int. Cl.[5] ................................................ A01N 1/00

[52] U.S. Cl. ........................................ 428/15; 264/73; 264/77; 264/246; 264/247; 264/261; 428/38

[58] Field of Search ............... 427/202, 206, 263, 268, 427/281; 428/15, 38; 264/73, 77, 246, 247, 261

[56] References Cited

U.S. PATENT DOCUMENTS

| | | | |
|---|---|---|---|
| 3,341,396 | 9/1967 | Iverson | 427/268 X |
| 4,137,215 | 1/1979 | Van Gusse | 264/77 X |
| 4,159,301 | 6/1979 | Buser et al. | 264/73 X |
| 4,680,155 | 7/1987 | Rochefort et al. | 264/73 |
| 4,791,022 | 12/1988 | Graham | 427/202 X |
| 4,853,276 | 8/1989 | Kurushima | 428/15 X |

*Primary Examiner*—Michael Lusigan
*Attorney, Agent, or Firm*—Ross, Ross & Flavin

[57] ABSTRACT

The invention discloses a method of making articles and items with one or more surfaces with a solid stone-like appearance by filling a space with two materials, one of which is a finely cut-up material and the other of which is a filler. The method includes steps which eliminate the apparent thickness of the transparent medium through which the finely cut-up material is seen, thus enhancing the stone-like appearance.

17 Claims, No Drawings

ARTICLES WITH STONE-LIKE SURFACES, AND METHOD OF MANUFACTURE THEREFOR

BACKGROUND OF THE INVENTION

The present invention relates to articles and items of furniture which from a distance appear to be made from, or to have visible surfaces of, solid stone wherein the effect is created by the appearance of a finely cut-up material when seen at a distance. The present invention also relates to a method of obtaining the solid stone-like appearance.

The phrase "articles and items of furniture", or the like, as used herein includes, but is not limited to: sculptures; large and small household items; wall cladding and coverings; domestic utensils; domestic and commercial furniture, fixtures and fittings; souvenirs; housing for clocks; and ornamental items and jewelry.

A stone-like finish has been found to be possible, by packing a volume of space within an article or item of furniture with finely cut-up material. However, the packing must be extremely dense within the packed volume, otherwise the material tends to settle over a period of time. The resultant visible air gap at the top of the material destroys the visual appearance of a stone-like finish. This settling effect is apparent, after a period of time, even when the material is initially densely packed.

Further, at some, if not all, angles of viewing or distances from the article or item, one is aware of the density or thickness of the transparent or translucent medium covering the material. From some angles or distances this can totally destroy the visible effect of the stone-like appearance.

BRIEF SUMMARY OF THE INVENTION

An object of the present invention is to provide articles and items of furniture which overcome these difficulties and present visible surfaces with a solid stone-like appearance. A further object of the invention is the provision of a method for making such articles and items of furniture.

The present invention provides articles and items of furniture which from a distance appear to be made from, or to have one or more visible outer surfaces of, solid stone, said articles and items including: a volume of space filled with at least two different types of material, a first type of material which is translucent, and at least one second type of material the or each type of second material being a closely packed, finely cut-up material; a translucent medium covering all of the visible surface of said space (when filled); and means to secure said materials within said space.

Preferably, the securing means includes the translucent medium.

The term "translucent" as used herein includes, but is not limited to, transparent or clear. Transparent, by definition, means "having the property of transmitting light without appreciable scattering so that bodies lying beyond are entirely visible." Merriam Webster's New Collegiate Dictionary, 1980, pg. 1233. Translucent, by definition, means "transmitting and diffusing light so that objects beyond cannot be seen clearly." Merriam Webster's New Collegiate Dictionary, 1980, pg. 1232. The term "see-through" as used herein includes either transparent or translucent material. The term translucent as used herein includes, but is not limited to, any material which is transparent or clear.

Said translucent medium may be rigid or flexible, depending on the article or item, e.g. a solid base for lamp (rigid medium) or a flexible table mat (flexible medium). Preferably, said medium, if rigid, is clear glass (which may or may not be non-reflective) or a rigid clear plastics material. Said medium, if flexible, preferably is a plastics material capable of being sprayed onto a surface and allowed to set or harden, or applied by other known means.

Said first type of material is in the nature of a filler, and is a liquid which sets to a solid or semi-solid. For example the most preferred filler is a plastics material which is liquid when worked with, but sets to a solid (e.g. a bonding material), and can also act as an adhesive.

Each said second type of material may be any material which is capable of being cut up, crushed (etc) into discrete, fine pieces or that are in this state naturally. For example the second type of material may be wood shavings, paper, fabric, mineral salts, stone chip, shells, sands and so on. The second type of material may also include material which is capable of forming discrete fine pieces, but which is worked with as a liquid, e.g. paint. Preferably, said second type of material is a fabric or paper which is printed or dyed on at least one side in one or more colours.

The printing on the material, where it occurs, is preferably dense. Preferably also, the material is thin. Preferably, the material is printed on both sides.

More preferably, the material is paper. It is currency notes, of pre-determined denomination(s), that have been withdrawn from public circulation by the duly authorized government body or bank.

Preferably, said securing means includes said bonding material which is used to secure some or all of said first type of material to the inner surface of the translucent medium.

Preferably, said distance is of the order of 1 meter or more.

The present invention also provides a method of making an article or item of furniture which from a distance appears to be made from, or to have one or more visible surfaces of, solid stone, said method including: providing at least one piece of a translucent medium, filling a space adjacent to and touching the inner surface of said translucent medium with at least one closely packed, finely cut-up second type of material, securing said second type of material within said space, with a first type of material to exclude all air from the area immediately adjacent the inner surface of each said piece of translucent medium; and completing the making of said item or article with said one piece of translucent medium forming an external surface of said item or article, said first and second types of material being visible through said pieces of translucent material.

The above method may further include the step of forming said space (into which said first and second types of material are secured) in the shape of a mould of the article or item. The translucent medium is then secured around the mould, and the making of the article or item completed.

DETAILED DESCRIPTION

By way of example only preferred examples of articles and items are described below, together with the preferred methods of manufacture.

In a first preferred embodiment of the method of the present invention the faces of a number of pieces of the transparent medium, for example the glass sides of a lamp stand, have a layer of an adhesive filler (a first type of material) applied thereto. The filler is then covered with a layer of finely cut-up currency notes, all of the same denomination (a second type of material). The paper is closely packed across the surface of the filler.

Pressure is applied (either manually or mechanically, in known manner) to flatten the pieces of notes against the glass and to push them into the layer of adhesive filler. The filler is allowed to set. The glass sides are then assembled to make the lamp stand, in known manner.

If so desired, prior to the assembly of the stand, another layer of cut-up material and adhesive filler may be applied in the same manner as described immediately above.

The thickness of the material adhering to the translucent medium, the glass in the above example, will depend on the nature of the second type of material. In the example above, using currency notes as the second type of material the desired thickness of the materials adhering to the glass is between one and five millimeters. With other materials, for example sands, mineral salts, the desired thickness is between 1 and 1.5 millimeters.

The adhesive filler may be any material which is worked as a liquid but can set to a solid. The filler should also be one which when set is translucent or transparent when less than 1 millimeter thick. In practice it has been found that flexible polyvinylacetate is the most suitable filler.

The result of this method is that there are extremely few or no air gaps between the cut-up material pieces or between the cut-up material and the transparent medium. The effect of this is that regardless of the angle the article or item of furniture is viewed at the thickness of the transparent medium is not apparent.

Whilst the reason for this is not fully understood, it appears that when a glass or clear plastic surface is backed or filled behind with materials without the adhesive filler, total internal reflection occurs. Thus the thickness of the glass or transparent medium is visible. When the adhesive agent is used, the inner boundary is altered and thus total reflection cannot occur, apparently. This creates the appearance of an object or surface actually made from the bonded material, whilst still retaining the high gloss properties of the glass or transparent medium used. This apparently creates the effect of highly polished stone or marble.

In a second preferred embodiment of the method of the present invention a money box with the above described external appearance may be made by filling a mould for the desired shape of box with a mixture of finely cut-up currency notes of the same denomination (as the second type of material), and an adhesive (as the first type of material), in known manner. After the mixture has set and is removed from the mould it can either be sprayed with a translucent plastics material, or the translucent material may be molded onto the exterior of the box in known manner to exclude all air adjacent the inner surface of the translucent material.

It will be appreciated that the more densely packed the material is, the finer the grain of the stone-like appearance from a distance. It will also be appreciated that the selection of sizes of the cut-up paper, the colours used in the printing on the paper and the nature and density of the printing, and the density to which the paper is packed may all be varied in achieving a predetermined stone-like appearance, e.g. the effect of a granite-like appearance can be attained by using densely packed, cut-up ten dollar notes.

It will be appreciated that the finely cut-up paper may be obtained by known means, e.g. cutting paper shredded into long thin strips; using paper that has been cut and shredded by the one machine, etc. It will also be appreciated that the finely cut-up paper may be non-uniform or uniform in shape, depending on the desired effect. If the cuttings are of uniform shape then preferably each piece is very small, e.g. 5 mm×10 mm, to attain a mottled stone effect from a distance. If a non-uniform shape of piece is used the size of the pieces may be bigger than those described above to create the same effect.

In practice it has been found that the size of the pieces used appears to be less important than the density of the pieces used.

The distance at which the desired stone-like appearance is achieved will depend on the size of the finely cut-up paper, the density to which it is packed, and to a lesser extent the density of the printing on the paper and whether it is printed on one or both sides.

Whilst the above examples have been described with reference to finely cut up paper, it will be appreciated that any material which is capable of forming discrete pieces of a small size can be used to achieve the desired effect.

We claim:

1. A method of making an article which from a distance appears to be made from or to have one or more visible surfaces of solid stone, the method including: providing a piece of see-through medium; applying to a selected surface of said see-through medium a layer of an adhesive filler material which is capable of being worked as a liquid but which sets solid, and which when set is see-through when less than 1 mm thick; covering said layer of adhesive filler with a tightly-packed continuous layer of finely cut-up paper and applying pressure to press said finely cut-up paper into said adhesive filler; allowing the adhesive filler to set, and completing the making of the article such that said see-through medium forms an external surface of the article and said layer of paper is visible through said see-through medium.

2. The method as claimed in claim 1 wherein said see-through medium is rigid.

3. The method as claimed in claim 2 wherein said see-through medium is glass.

4. The method as claimed in claim 2 wherein said see-through medium is a plastics material.

5. The method in claim 1 wherein said see-through medium is flexible.

6. The method as claimed in claim 5 wherein said see-through medium is a plastics material.

7. The method as claimed in claim 1 wherein the adhesive filler is polyvinylacetate.

8. The method as claimed in claim 1 wherein the finely cut-up paper is currency notes which have been withdrawn from public circulation by the duly authorized government body.

9. An article made in accordance with the method of claim 1.

10. A method of making an article which from a distance appears to be made from or to have one or more visible surfaces of solid stone, the method including: providing a piece of see-through medium; applying to a selected surface of said see-through medium a layer of an adhesive filler material which is capable of being worked as a liquid but which sets solid, and which when set is see-through when less than 1 mm thick; covering said layer of adhesive filler with a tightly-packed continuous layer of finely cut-up fabric and applying pressure to press said finely cut-up fabric into said adhesive filler; allowing the adhesive filler to set, and completing the making of the article such that said see-through medium forms an external surface of the article and said layer of fabric is visible through said see-through medium.

11. The method as claimed in claim 10 wherein said see-through medium is rigid.

12. The method as claimed in claim 11 wherein said see-through medium is glass.

13. The method as claimed in claim 11 wherein said see-through medium is a plastics material.

14. The method as claimed in claim 10 wherein said see-through medium is flexible.

15. The method as claimed in claim 14 wherein said see-through medium is a plastics material.

16. The method as claimed in claim 10 wherein the adhesive filler is polyvinylacetate.

17. An article made in accordance with the method of claim 10.

* * * * *